United States Patent
Isaka et al.

(10) Patent No.: US 12,540,208 B2
(45) Date of Patent: Feb. 3, 2026

(54) COPOLYMER, MOLDED BODY, INJECTION MOLDED BODY, AND COATED ELECTRICAL WIRE

(71) Applicant: DAIKIN INDUSTRIES, LTD., Osaka (JP)

(72) Inventors: Tadaharu Isaka, Osaka (JP); Yumi Zenke, Osaka (JP); Yukari Yamamoto, Osaka (JP); Hayato Tsuda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 167 days.

(21) Appl. No.: 18/454,141

(22) Filed: Aug. 23, 2023

(65) Prior Publication Data

US 2023/0391933 A1 Dec. 7, 2023

Related U.S. Application Data

(63) Continuation of application No. PCT/JP2022/003657, filed on Jan. 31, 2022.

(30) Foreign Application Priority Data

| Feb. 26, 2021 | (JP) | 2021-031090 |
| Feb. 26, 2021 | (JP) | 2021-031095 |
| Sep. 30, 2021 | (JP) | 2021-162159 |

(51) Int. Cl.
- *H01B 7/02* (2006.01)
- *C08F 214/26* (2006.01)
- *H01B 3/44* (2006.01)

(52) U.S. Cl.
CPC ......... *C08F 214/262* (2013.01); *H01B 3/441* (2013.01); *H01B 7/02* (2013.01); *C08F 2500/12* (2013.01)

(58) Field of Classification Search
CPC . H01B 3/441; H01B 7/02; H01B 3/30; H01B 3/445; H01B 3/44; H01B 7/18; C08F 214/262; C08F 2500/12; C08F 16/24; C08F 214/28; C08F 214/265; C08F 214/20; C08F 214/26; C08F 8/00; B32B 1/08; B32B 27/08; B29C 45/00
USPC .... 174/138 R, 137 R, 138 C, 110 R–120 SR, 174/137 A; 526/247, 249, 248, 250, 254, 526/255; 521/149; 428/36.91, 421, 422; 156/51, 60; 264/113, 127, 173.11, 264/173.13, 173.14

See application file for complete search history.

(56) References Cited

U.S. PATENT DOCUMENTS

| 3,635,926 | A | 1/1972 | Gresham et al. |
| 3,945,786 | A | 3/1976 | Bishop |
| 4,029,868 | A | 6/1977 | Carlson |
| 4,262,101 | A | 4/1981 | Hartwimmer et al. |
| 4,414,356 | A | 11/1983 | Michel |
| 4,510,300 | A | 4/1985 | Levy |
| 4,743,658 | A | 5/1988 | Imbalzano et al. |
| 4,902,444 | A | 2/1990 | Kolouch |
| 5,000,875 | A | 3/1991 | Kolouch |
| 5,656,392 | A | 8/1997 | Sano et al. |
| 5,767,198 | A | 6/1998 | Shimizu et al. |
| 5,851,693 | A | 12/1998 | Sano et al. |
| 6,069,215 | A | 5/2000 | Araki et al. |
| 6,096,795 | A | 8/2000 | Abusleme et al. |
| 6,689,833 | B1 | 2/2004 | Bidstrup et al. |
| 6,713,183 | B2 | 3/2004 | Araki et al. |
| 6,740,375 | B1 | 5/2004 | Sagisaka et al. |
| 6,774,196 | B1 | 8/2004 | Taira et al. |
| 7,169,868 | B2 * | 1/2007 | Aoyama ................... C08F 8/22 |
| | | | 152/209.1 |
| 8,058,556 | B2 * | 11/2011 | Ishii ....................... H01B 3/445 |
| | | | 174/110 SR |
| 11,826,975 | B2 * | 11/2023 | Imamura ............. C08F 214/282 |
| 2002/0011692 | A1 | 1/2002 | Lahijani |
| 2002/0099143 | A1 | 7/2002 | Namura |
| 2003/0013791 | A1 | 1/2003 | Blong et al. |
| 2003/0109646 | A1 | 6/2003 | Kubo et al. |
| 2003/0114615 | A1 | 6/2003 | Sumi et al. |
| 2003/0190530 | A1 | 10/2003 | Yang et al. |
| 2003/0216531 | A1 | 11/2003 | Aten et al. |
| 2004/0072935 | A1 | 4/2004 | Blong et al. |
| 2004/0102572 | A1 | 5/2004 | Kubo et al. |
| 2004/0204536 | A1 | 10/2004 | Miyatani et al. |
| 2004/0260044 | A1 | 12/2004 | Earnest, Jr. et al. |
| 2005/0020792 | A1 | 1/2005 | Aoyama et al. |
| 2007/0112155 | A1 | 5/2007 | Takase et al. |

(Continued)

FOREIGN PATENT DOCUMENTS

| CN | 1599757 A | 3/2005 |
| CN | 103946250 A | 7/2014 |

(Continued)

OTHER PUBLICATIONS

Translation of the International Search Report issued Oct. 13, 2020 in International Application No. PCT/JP2020/032236.
Translation of the International Search Report issued Oct. 13, 2020 in International Application No. PCT/JP2020/032237.
Translation of the International Search Report issued Oct. 13, 2020 in International Application No. PCT/JP2020/032238.
Translation of the International Search Report issued Oct. 13, 2020 in International Application No. PCT/JP2020/032239.
Translation of the International Search Report issued Oct. 6, 2020 in International Application No. PCT/JP2020/032234.
International Preliminary Report on Patentability, with Translation of Written Opinion issued Mar. 1, 2022 in International Application No. PCT/JP2020/032238.

(Continued)

*Primary Examiner* — Angel R Estrada
(74) *Attorney, Agent, or Firm* — Sughrue Mion, PLLC

(57) ABSTRACT

A copolymer containing tetrafluoroethylene unit and perfluoro (propyl vinyl ether) unit, wherein the copolymer has a content of perfluoro (propyl vinyl ether) unit of 3.5 to 4.2% by mass with respect to the whole of the monomer units, a melt flow rate at 372° C. of 18.0 to 22.0 g/10 min, and the number of functional groups of 50 or less per $10^6$ main-chain carbon atoms.

4 Claims, No Drawings

(56) References Cited

U.S. PATENT DOCUMENTS

| | | |
|---|---|---|
| 2007/0149734 A1 | 6/2007 | Sakakibara et al. |
| 2007/0281166 A1 | 12/2007 | Nishio |
| 2008/0038627 A1 | 2/2008 | Yamauchi et al. |
| 2008/0114143 A1 | 5/2008 | Brothers et al. |
| 2009/0038821 A1 | 2/2009 | Sato et al. |
| 2009/0044965 A1 | 2/2009 | Kono et al. |
| 2009/0176952 A1 | 7/2009 | Funaki et al. |
| 2009/0246435 A1 | 10/2009 | Shimono et al. |
| 2010/0063214 A1 | 3/2010 | Kasahara et al. |
| 2010/0212929 A1 | 8/2010 | Ishii et al. |
| 2010/0273047 A1 | 10/2010 | Kunoike et al. |
| 2010/0314153 A1 | 12/2010 | Ishii et al. |
| 2010/0314154 A1 | 12/2010 | Kitahara et al. |
| 2011/0052970 A1 | 3/2011 | Kurata et al. |
| 2011/0052977 A1 | 3/2011 | Kurata et al. |
| 2011/0104562 A1 | 5/2011 | Byun et al. |
| 2011/0203830 A1 | 8/2011 | Kono et al. |
| 2011/0272173 A1 | 11/2011 | Shiotsuki et al. |
| 2012/0035329 A1 | 2/2012 | Isogai et al. |
| 2012/0094169 A1 | 4/2012 | Kim et al. |
| 2013/0130100 A1 | 5/2013 | Kurata et al. |
| 2014/0227533 A1 | 8/2014 | Murakami et al. |
| 2014/0287177 A1 | 9/2014 | Suda et al. |
| 2014/0378616 A1 | 12/2014 | Nakano et al. |
| 2015/0041145 A1 | 2/2015 | Colaianna et al. |
| 2015/0148481 A1 | 5/2015 | Brothers et al. |
| 2015/0158988 A1 | 6/2015 | Sawaki et al. |
| 2016/0006004 A1 | 1/2016 | Ogawa et al. |
| 2016/0108159 A1 | 4/2016 | Sekiguchi et al. |
| 2016/0272805 A1 | 9/2016 | Nakanishi et al. |
| 2016/0319089 A1 | 11/2016 | Imamura et al. |
| 2016/0322128 A1 | 11/2016 | Imamura et al. |
| 2017/0008986 A1 | 1/2017 | Isaka et al. |
| 2017/0025204 A1 | 1/2017 | Chapman et al. |
| 2017/0154707 A1 | 6/2017 | Abe et al. |
| 2017/0214037 A1 | 7/2017 | Uematsu et al. |
| 2017/0260344 A1 | 9/2017 | Imamura et al. |
| 2018/0009204 A1 | 1/2018 | Higuchi et al. |
| 2018/0036931 A1 | 2/2018 | Higuchi et al. |
| 2018/0237566 A1 | 8/2018 | Aida et al. |
| 2018/0265654 A1 | 9/2018 | Imamura et al. |
| 2018/0283590 A1 | 10/2018 | Yokoyama et al. |
| 2019/0134939 A1 | 5/2019 | Colaianna et al. |
| 2019/0143628 A1 | 5/2019 | Colaianna et al. |
| 2019/0177453 A1 | 6/2019 | Isaka et al. |
| 2019/0193315 A1 | 6/2019 | Miyamoto et al. |
| 2019/0375929 A1 | 12/2019 | Nishimura et al. |
| 2020/0332037 A1 | 10/2020 | Isaka et al. |
| 2021/0008827 A1 | 1/2021 | Colaianna et al. |
| 2021/0008828 A1 | 1/2021 | Colaianna et al. |
| 2021/0024769 A1 | 1/2021 | Imamura et al. |
| 2021/0189031 A1 | 6/2021 | Hintzer et al. |
| 2021/0269568 A1 | 9/2021 | Imamura et al. |
| 2022/0001657 A1 | 1/2022 | Kikuchi et al. |
| 2022/0033636 A1 | 2/2022 | Nishimura et al. |
| 2022/0170573 A1 | 6/2022 | Imamura et al. |
| 2022/0181689 A1 | 6/2022 | Isaka et al. |
| 2022/0181698 A1 | 6/2022 | Isaka et al. |
| 2022/0181729 A1 | 6/2022 | Isaka et al. |
| 2022/0195088 A1 | 6/2022 | Imamura et al. |
| 2022/0213996 A1 | 7/2022 | Imamura et al. |
| 2022/0266485 A1 | 8/2022 | Tsuda et al. |
| 2022/0278403 A1 | 9/2022 | Isaka et al. |
| 2023/0227594 A1 | 7/2023 | Yamamoto et al. |
| 2023/0235107 A1 | 7/2023 | Isaka et al. |
| 2023/0235159 A1 | 7/2023 | Isaka et al. |
| 2023/0235160 A1 | 7/2023 | Isaka et al. |
| 2023/0238627 A1 | 7/2023 | Isaka et al. |
| 2023/0238628 A1 | 7/2023 | Zenke et al. |
| 2023/0238629 A1 | 7/2023 | Isaka et al. |
| 2023/0272136 A1 | 8/2023 | Zenke et al. |
| 2023/0295356 A1 | 9/2023 | Isaka et al. |
| 2023/0383031 A1 | 11/2023 | Isaka et al. |
| 2023/0383032 A1 | 11/2023 | Isaka et al. |
| 2023/0383033 A1 | 11/2023 | Zenke et al. |
| 2023/0383034 A1 | 11/2023 | Isaka et al. |
| 2023/0390977 A1 | 12/2023 | Hamada et al. |
| 2023/0390978 A1 | 12/2023 | Tsuda et al. |
| 2023/0390979 A1 | 12/2023 | Tsuda et al. |
| 2023/0390980 A1 | 12/2023 | Tsuda et al. |
| 2023/0390981 A1 | 12/2023 | Tsuda et al. |
| 2023/0391909 A1 | 12/2023 | Isaka et al. |
| 2023/0391910 A1 | 12/2023 | Isaka et al. |
| 2023/0391911 A1 | 12/2023 | Isaka et al. |
| 2023/0391912 A1 | 12/2023 | Isaka et al. |
| 2023/0391917 A1 | 12/2023 | Isaka et al. |
| 2023/0391920 A1 | 12/2023 | Isaka et al. |
| 2023/0391927 A1 | 12/2023 | Isaka |
| 2023/0391929 A1 | 12/2023 | Isaka et al. |
| 2023/0391931 A1 | 12/2023 | Isaka et al. |
| 2023/0391932 A1 | 12/2023 | Isaka et al. |
| 2023/0391933 A1 | 12/2023 | Isaka et al. |
| 2023/0392737 A1 | 12/2023 | Tsuda et al. |
| 2023/0395282 A1 | 12/2023 | Isaka et al. |
| 2023/0399431 A1 | 12/2023 | Isaka et al. |
| 2023/0399432 A1 | 12/2023 | Isaka et al. |
| 2023/0399438 A1 | 12/2023 | Isaka et al. |
| 2023/0399441 A1 | 12/2023 | Isaka et al. |
| 2023/0399443 A1 | 12/2023 | Isaka et al. |
| 2023/0406975 A1 | 12/2023 | Isaka et al. |
| 2023/0406976 A1 | 12/2023 | Isaka et al. |
| 2023/0411751 A1 | 12/2023 | Tsuda et al. |
| 2023/0415387 A1 | 12/2023 | Hamada et al. |
| 2025/0002728 A1 | 1/2025 | Zenke et al. |
| 2025/0011488 A1 | 1/2025 | Isaka et al. |
| 2025/0011490 A1 | 1/2025 | Isaka et al. |
| 2025/0011494 A1 | 1/2025 | Isaka et al. |
| 2025/0011496 A1 | 1/2025 | Yamamoto et al. |
| 2025/0011498 A1 | 1/2025 | Isaka et al. |
| 2025/0011499 A1 | 1/2025 | Isaka et al. |
| 2025/0011500 A1 | 1/2025 | Isaka et al. |
| 2025/0019476 A1 | 1/2025 | Isaka et al. |
| 2025/0034302 A1 | 1/2025 | Isaka et al. |

FOREIGN PATENT DOCUMENTS

| | | |
|---|---|---|
| CN | 107428144 A | 12/2017 |
| CN | 109476061 A | 3/2019 |
| CN | 110712348 A | 1/2020 |
| CN | 110790854 A | 2/2020 |
| CN | 114223086 A | 3/2022 |
| CN | 114258609 A | 3/2022 |
| CN | 116390957 A | 7/2023 |
| CN | 116867821 A | 10/2023 |
| CN | 116917346 A | 10/2023 |
| EP | 0 220 910 A2 | 5/1987 |
| EP | 0 423 995 A1 | 4/1991 |
| EP | 0 976 544 A1 | 2/2000 |
| EP | 1 462 458 A1 | 9/2004 |
| EP | 4 024 550 A1 | 7/2022 |
| EP | 4 024 575 A1 | 7/2022 |
| EP | 4 223 793 A1 | 8/2023 |
| EP | 4 223 794 A1 | 8/2023 |
| GB | 1210794 A | 10/1970 |
| JP | 48-20788 B1 | 6/1973 |
| JP | 58-132512 A | 8/1983 |
| JP | 58-191127 A | 11/1983 |
| JP | 59-120433 A | 7/1984 |
| JP | 62-104822 A | 5/1987 |
| JP | 62-53019 B2 | 11/1987 |
| JP | 1-53167 B2 | 11/1989 |
| JP | 2-129253 A | 5/1990 |
| JP | 3-184209 A | 8/1991 |
| JP | 3-247609 A | 11/1991 |
| JP | 4-357398 A | 12/1992 |
| JP | 6-1902 A | 1/1994 |
| JP | 6-40813 B2 | 6/1994 |
| JP | 6-287405 A | 10/1994 |
| JP | 7-16869 A | 1/1995 |
| JP | 7-112449 A | 5/1995 |
| JP | 7-188337 A | 7/1995 |
| JP | 7-290496 A | 11/1995 |
| JP | 8-207106 A | 8/1996 |
| JP | 8-321287 A | 12/1996 |

(56) References Cited

FOREIGN PATENT DOCUMENTS

| | | |
|---|---|---|
| JP | 9-245832 A | 9/1997 |
| JP | 10-87746 A | 4/1998 |
| JP | 10-275604 A | 10/1998 |
| JP | 10-292054 A | 11/1998 |
| JP | 2001-151825 A | 6/2001 |
| JP | 2001-151826 A | 6/2001 |
| JP | 2001-283907 A | 10/2001 |
| JP | 2001-283921 A | 10/2001 |
| JP | 2002-53620 A | 2/2002 |
| JP | 2002-63934 A | 2/2002 |
| JP | 2002-167488 A | 6/2002 |
| JP | 2003-327770 A | 11/2003 |
| JP | 2003-534940 A | 11/2003 |
| JP | 2004-256406 A | 9/2004 |
| JP | 2004-534131 A | 11/2004 |
| JP | 2005-523979 A | 8/2005 |
| JP | 2005-298659 A | 10/2005 |
| JP | 2005-320497 A | 11/2005 |
| JP | 2006-117912 A | 5/2006 |
| JP | 2006-312736 A | 11/2006 |
| JP | 2007-238960 A | 9/2007 |
| JP | 2008-66254 A | 3/2008 |
| JP | 2009-42478 A | 2/2009 |
| JP | 2009-59690 A | 3/2009 |
| JP | 2009-235564 A | 10/2009 |
| JP | 2009-272207 A | 11/2009 |
| JP | 2010-56079 A | 3/2010 |
| JP | 2010-509443 A | 3/2010 |
| JP | 2010-85741 A | 4/2010 |
| JP | 2010-162817 A | 7/2010 |
| JP | 2010-235667 A | 10/2010 |
| JP | 2011-48976 A | 3/2011 |
| JP | 2011-71104 A | 4/2011 |
| JP | 2012-54269 A | 3/2012 |
| JP | 2012-80911 A | 4/2012 |
| JP | 2012-106494 A | 6/2012 |
| JP | 2012-130557 A | 7/2012 |
| JP | 2013-71341 A | 4/2013 |
| JP | 2013-82888 A | 5/2013 |
| JP | 2013-177574 A | 9/2013 |
| JP | 2014-28951 A | 2/2014 |
| JP | 2014-59052 A | 4/2014 |
| JP | 2014-187040 A | 10/2014 |
| JP | 2015-7218 A | 1/2015 |
| JP | 2015-519410 A | 7/2015 |
| JP | 2015-147924 A | 8/2015 |
| JP | 2015-168840 A | 9/2015 |
| JP | 2016-537499 A | 12/2016 |
| JP | 2017-197690 A | 11/2017 |
| JP | 2018-20468 A | 2/2018 |
| JP | 2018-51 4598 A | 6/2018 |
| JP | 2018-523272 A | 8/2018 |
| JP | 2018-159090 A | 10/2018 |
| JP | 2019-172962 A | 10/2019 |
| JP | 2019-210420 A | 12/2019 |
| JP | 2019-214641 A | 12/2019 |
| JP | 2020-2341 A | 1/2020 |
| JP | 2020-15906 A | 1/2020 |
| JP | 2020-29042 A | 2/2020 |
| JP | 2020-100823 A | 7/2020 |
| JP | 2020-100843 A | 7/2020 |
| JP | 2021-6648 A | 1/2021 |
| JP | 2021-141043 A | 9/2021 |
| JP | 2021-141045 A | 9/2021 |
| JP | 2022-19196 A | 1/2022 |
| KR | 10-2004-0071160 A | 8/2004 |
| KR | 10-2019-0034205 A | 4/2019 |
| WO | 95/29956 A1 | 11/1995 |
| WO | 01/40331 A1 | 6/2001 |
| WO | 03/006566 A1 | 1/2003 |
| WO | 03/048214 A1 | 6/2003 |
| WO | 2004/052987 A1 | 6/2004 |
| WO | 2008/032613 A1 | 3/2008 |
| WO | 2008/047759 A1 | 4/2008 |
| WO | 2008/047906 A1 | 4/2008 |
| WO | 2008/143069 A1 | 11/2008 |
| WO | 2010/113864 A1 | 10/2010 |
| WO | 2013/115374 A1 | 8/2013 |
| WO | 2014/007346 A1 | 1/2014 |
| WO | 2014/129413 A1 | 8/2014 |
| WO | 2015/119053 A1 | 8/2015 |
| WO | 2016/117492 A1 | 7/2016 |
| WO | 2017/056203 A1 | 4/2017 |
| WO | 2017/082417 A1 | 5/2017 |
| WO | 2019/003265 A1 | 1/2019 |
| WO | 2020/004083 A1 | 1/2020 |
| WO | 2020/090981 A1 | 5/2020 |
| WO | 2020/204163 A1 | 10/2020 |
| WO | 2021/033539 A1 | 2/2021 |
| WO | 2021/039862 A1 | 3/2021 |
| WO | 2021/039863 A1 | 3/2021 |
| WO | 2021/039865 A1 | 3/2021 |
| WO | 2021039864 A1 | 3/2021 |
| WO | 2021/059753 A1 | 4/2021 |
| WO | 2022/181225 A1 | 1/2022 |

OTHER PUBLICATIONS

International Preliminary Report on Patentability, with Translation of Written Opinion issued Mar. 1, 2022 in International Application No. PCT/JP2020/032239.
International Preliminary Report on Patentability, with Translation of Written Opinion issued Mar. 1, 2022 in International Application No. PCT/JP2020/032236.
International Preliminary Report on Patentability, with Translation of Written Opinion issued Mar. 1, 2022 in International Application No. PCT/JP2020/032237.
International Preliminary Report on Patentability, with Translation of Written Opinion issued Mar. 1, 2022 in International Application No. PCT/JP2020/032234.
Translation of the International Search Report dated Dec. 21, 2021 in International Application No. PCT/JP2021/036301.
Translation of the International Search Report dated Dec. 21, 2021 in International Application No. PCT/JP2021/036302.
Translation of the International Search Report dated Dec. 21, 2021 in International Application No. PCT/JP2021/036303.
Translation of the International Search Report dated Nov. 9, 2021 in International Application No. PCT/JP2021/036304.
Translation of the International Search Report dated Apr. 12, 2022 in International Application No. PCT/JP2022/003643.
Translation of the International Search Report dated Nov. 1, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.
Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.

(56) References Cited

OTHER PUBLICATIONS

Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.
Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
International Preliminary Report on Patentability, with Translation of Written Opinion issued Mar. 28, 2023 in International Application No. PCT/JP2021/036301.
International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.
International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.
International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
European Search Report issued Aug. 2, 2023 for European Patent Application No. 20 857 704.9.
International Preliminary Report on Patentability, with Translation of Written Opinion issued Aug. 29, 2023 in International Application No. PCT/JP2022/003634.
International Preliminary Report on Patentability, with Translation of Written Opinion issued Aug. 29, 2023 in International Application No. PCT/JP2022/003635.
International Preliminary Report on Patentability, with Translation of Written Opinion issued Aug. 29, 2023 in International Application No. PCT/JP2022/003636.
International Preliminary Report on Patentability, with Translation of Written Opinion issued Aug. 29, 2023 in International Application No. PCT/JP2022/003637.
International Preliminary Report on Patentability, with Translation of Written Opinion issued Aug. 29, 2023 in International Application No. PCT/JP2022/003638.
International Preliminary Report on Patentability, with Translation of Written Opinion issued Aug. 29, 2023 in International Application No. PCT/JP2022/003640.
International Preliminary Report on Patentability, with Translation of Written Opinion issued Aug. 29, 2023 in International Application No. PCT/JP2022/003641.
International Preliminary Report on Patentability, with Translation of Written Opinion issued Aug. 29, 2023 in International Application No. PCT/JP2022/003642.
International Preliminary Report on Patentability, with Translation of Written Opinion issued Aug. 29, 2023 in International Application No. PCT/JP2022/003643.
International Preliminary Report on Patentability, with Translation of Written Opinion issued Aug. 29, 2023 in International Application No. PCT/JP2022/003644.
International Preliminary Report on Patentability, with Translation of Written Opinion issued Aug. 29, 2023 in International Application No. PCT/JP2022/003645.
International Preliminary Report on Patentability, with Translation of Written Opinion issued Aug. 29, 2023 in International Application No. PCT/JP2022/003646.
International Preliminary Report on Patentability, with Translation of Written Opinion issued Aug. 29, 2023 in International Application No. PCT/JP2022/003647.
International Preliminary Report on Patentability, with Translation of Written Opinion issued Aug. 29, 2023 in International Application No. PCT/JP2022/003648.
International Preliminary Report on Patentability, with Translation of Written Opinion issued Aug. 29, 2023 in International Application No. PCT/JP2022/003649.
International Preliminary Report on Patentability, with Translation of Written Opinion issued Aug. 29, 2023 in International Application No. PCT/JP2022/003650.
International Preliminary Report on Patentability, with Translation of Written Opinion issued Aug. 29, 2023 in International Application No. PCT/JP2022/003651.
International Preliminary Report on Patentability, with Translation of Written Opinion issued Aug. 29, 2023 in International Application No. PCT/JP2022/003652.
International Preliminary Report on Patentability, with Translation of Written Opinion issued Aug. 29, 2023 in International Application No. PCT/JP2022/003653.
International Preliminary Report on Patentability, with Translation of Written Opinion issued Aug. 29, 2023 in International Application No. PCT/JP2022/003654.
International Preliminary Report on Patentability, with Translation of Written Opinion issued Aug. 29, 2023 in International Application No. PCT/JP2022/003657.
International Preliminary Report on Patentability, with Translation of Written Opinion issued Aug. 29, 2023 in International Application No. PCT/JP2022/003658.

(56) References Cited

OTHER PUBLICATIONS

International Preliminary Report on Patentability, with Translation of Written Opinion issued Aug. 29, 2023 in International Application No. PCT/JP2022/003659.
International Preliminary Report on Patentability, with Translation of Written Opinion issued Aug. 29, 2023 in International Application No. PCT/JP2022/003660.
International Preliminary Report on Patentability, with Translation of Written Opinion issued Aug. 29, 2023 in International Application No. PCT/JP2022/003661.
International Preliminary Report on Patentability, with Translation of Written Opinion issued Aug. 29, 2023 in International Application No. PCT/JP2022/003664.
International Preliminary Report on Patentability, with Translation of Written Opinion issued Aug. 29, 2023 in International Application No. PCT/JP2022/003665.
International Preliminary Report on Patentability, with Translation of Written Opinion issued Aug. 29, 2023 in International Application No. PCT/JP2022/007735.
International Preliminary Report on Patentability, with Translation of Written Opinion issued Aug. 29, 2023 in International Application No. PCT/JP2022/007737.
International Preliminary Report on Patentability, with Translation of Written Opinion issued Aug. 29, 2023 in International Application No. PCT/JP2022/007738.
Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.
Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
U.S. Appl. No. 17/679,789, filed Feb. 24, 2022, Isaka, et al., cont of PCT/JP2020/032238.
U.S. Appl. No. 17/679,831, filed Feb. 24, 2022, Isaka, et al., cont of PCT/JP2020/032239.
U.S. Appl. No. 17/679,818, filed Feb. 24, 2022, Isaka, et al., cont of PCT/JP2020/032236.
U.S. Appl. No. 17/679,765, filed Feb. 24, 2022, Isaka, et al., cont of PCT/JP2020/032237.
U.S. Appl. No. 17/680,911, filed Feb. 25, 2022, Tsuda, et al., cont of PCT/JP2020/032234.
U.S. Appl. No. 18/191,412, filed Mar. 28, 2023, Isaka, et al., cont of PCT/JP2021/036301.
U.S. Appl. No. 18/191,461, filed Mar. 28, 2023, Zenke, et al., cont of PCT/JP2021/036302.
U.S. Appl. No. 18/192,020, filed Mar. 29, 2023, Isaka, et al., cont of PCT/JP2021/036303.
U.S. Appl. No. 18/192,053, filed Mar. 29, 2023, Isaka, et al., cont of PCT/JP2021/036304.
U.S. Appl. No. 18/192,101, filed Mar. 29, 2023, Yamamoto, et al., cont of PCT/JP2021/036305.
U.S. Appl. No. 18/191,996, filed Mar. 29, 2023, Tsuda, et al., cont of PCT/JP2021/036306.
U.S. Appl. No. 18/192,052, filed Mar. 29, 2023, Zenke, et al., cont of PCT/JP2021/036307.
U.S. Appl. No. 18/192,011, filed Mar. 29, 2023, Isaka, et al., cont of PCT/JP2021/036308.
U.S. Appl. No. 18/192,077, filed Mar. 29, 2023, Isaka, et al., cont of PCT/JP2021/036309.
U.S. Appl. No. 18/192,298, filed Mar. 29, 2023, Isaka, et al., cont of PCT/JP2021/036310.
U.S. Appl. No. 18/453,775, filed Aug. 22, 2023, Tsuda, et al., cont of PCT/JP2022/007735.
U.S. Appl. No. 18/453,690, filed Aug. 22, 2023, Tsuda, et al., cont of PCT/JP2022/007737.
U.S. Appl. No. 18/452,806, filed Aug. 21, 2023, Tsuda, et al., cont of PCT/JP2022/007738.
U.S. Appl. No. 18/450,642, filed Aug. 16, 2023, Isaka, et al., cont of PCT/JP2022/003634.
U.S. Appl. No. 18/448,291, filed Aug. 11, 2023, Isaka, et al., cont of PCT/JP2022/003635.
U.S. Appl. No. 18/449,061, filed Aug. 14, 2023, Isaka, et al., cont of PCT/JP2022/003636.
U.S. Appl. No. 18/448,234, filed Aug. 11, 2023, Isaka, et al., cont of PCT/JP2022/003637.
U.S. Appl. No. 18/453,363, filed Aug. 22, 2023, Isaka, et al., cont of PCT/JP2022/003638.
U.S. Appl. No. 18/449,788, filed Aug. 15, 2023, Isaka, et al., cont of PCT/JP2022/003640.
U.S. Appl. No. 18/451,502, filed Aug. 17, 2023, Isaka, et al., cont of PCT/JP2022/003641.
U.S. Appl. No. 18/450,590, filed Aug. 16, 2023, Tsuda, et al., cont of PCT/JP2022/003642.
U.S. Appl. No. 18/450,094, filed Aug. 15, 2023, Hamada, et al., cont of PCT/JP2022/003643.
U.S. Appl. No. 18/449,845, filed Aug. 15, 2023, Zenke, et al., cont of PCT/JP2022/003644.
U.S. Appl. No. 18/446,746, filed Aug. 9, 2023, Isaka, et al., cont of PCT/JP2022/003645.
U.S. Appl. No. 18/450,491, filed Aug. 16, 2023, Isaka, et al., cont of PCT/JP2022/003646.
U.S. Appl. No. 18/451,525, filed Aug. 17, 2023, Isaka, et al., cont of PCT/JP2022/003647.
U.S. Appl. No. 18/451,455, filed Aug. 17, 2023, Isaka, et al., cont of PCT/JP2022/003468.
U.S. Appl. No. 18/452,107, filed Aug. 18, 2023, Isaka, et al., cont of PCT/JP2022/003649.
U.S. Appl. No. 18/452,146, filed Aug. 18, 2023, Isaka, et al., cont of PCT/JP2022/003650.
U.S. Appl. No. 18/448,341, filed Aug. 11, 2023, Isaka, et al., cont of PCT/JP2022/003651.
U.S. Appl. No. 18/449,778, filed Aug. 15, 2023, Isaka, et al., cont of PCT/JP2022/003652.
U.S. Appl. No. 18/447,877, filed Aug. 10, 2023, Isaka, et al., cont of PCT/JP2022/003653.
U.S. Appl. No. 18/452,908, filed Aug. 21, 2023, Isaka, et al., cont of PCT/JP2022/003654.
U.S. Appl. No. 18/454,141, filed Aug. 23, 2023, Isaka, et al., cont of PCT/JP2022/003657.
U.S. Appl. No. 18/453,709, filed Aug. 22, 2023, Isaka, et al., cont of PCT/JP2022/003658.
U.S. Appl. No. 18/452,769, filed Aug. 21, 2023, Isaka, et al., cont of PCT/JP2022/003659.
U.S. Appl. No. 18/453,810, filed Aug. 22, 2023, Tsuda, et al., cont of PCT/JP2022/003660.
U.S. Appl. No. 18/450,568, filed Aug. 16, 2023, Hamada, et al., cont of PCT/JP2022/003661.
U.S. Appl. No. 18/453,683, filed Aug. 22, 2023, Isaka, et al., cont of PCT/JP2022/003664.

(56) References Cited

OTHER PUBLICATIONS

U.S. Appl. No. 18/454,133, filed Aug. 23, 2023, Isaka, et al., cont of PCT/JP2022/003665.
International Search Report dated Jun. 20, 2023 in International Application No. PCT/JP2023/013284.
International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.
International Search Report dated Jun. 6, 2023 for International Application No. PCT/JP2023/013291.
International Search Report dated Jun. 6, 2023 for International Application No. PCT/JP2023/013292.
International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.
International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.
International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.
International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
European Search Report issued Feb. 10, 2025 for European Patent Application No. 22759283.9.
European Search Report issued Feb. 20, 2025 for European Patent Application No. 22759263.1.
European Search Report issued Dec. 4, 2024 for European Patent Application No. 22759287.0.
European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al., "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).

* cited by examiner

COPOLYMER, MOLDED BODY, INJECTION MOLDED BODY, AND COATED ELECTRICAL WIRE

CROSS-REFERENCE TO RELATED APPLICATIONS

This application is a Rule 53(b) Continuation of International Application No. PCT/JP2022/003657 filed Jan. 31, 2022, which claims priorities based on Japanese Patent Application No. 2021-031090 filed Feb. 26, 2021, Japanese Patent Application No. 2021-031095 filed Feb. 26, 2021 and Japanese Patent Application No. 2021-162159 filed Sep. 30, 2021, the respective disclosures of which are incorporated herein by reference in their entirety.

TECHNICAL FIELD

The present disclosure relates to a copolymer, a formed article, an injection molded article, and a coated electric wire.

BACKGROUND ART

Patent Document 1 describes a coated electric wire obtained by coating a TFE-based copolymer on a core wire, the copolymer having TFE unit originated from tetrafluoroethylene [TFE] and a PAVE unit originated from perfluoro (alkyl vinyl ether) [PAVE], having the PAVE unit higher than 5% by mass and 20% by mass or lower of the whole of the monomer units, having unstable terminal groups of 10 or less per $1 \times 10^6$ carbon atoms, and having a melting point of 260° C. or higher.

RELATED ART

Patent Document

Patent Document 1: Japanese Patent Laid-Open No. 2009-059690

SUMMARY

According to the present disclosure, there is provided a copolymer containing tetrafluoroethylene unit and perfluoro (propyl vinyl ether) unit, wherein the copolymer has a content of perfluoro(propyl vinyl ether) unit of 3.5 to 4.2% by mass with respect to the whole of the monomer units, a melt flow rate at 372° C. of 18.0 to 22.0 g/10 min, and the number of functional groups of 50 or less per $10^6$ main-chain carbon atoms.

Effects

According to the present disclosure, there can be provided a copolymer which enables beautiful formed articles in various shapes to be obtained by an injection molding method, even when a mold to be used in molding has a low temperature, enables a coating layer uniform in thickness to be formed on a core wire having a small diameter by an extrusion forming method, and enables formed articles excellent in the abrasion resistance, the oxygen low permeability, the chemical solution low permeability, the creep resistance, the rigidity at high temperatures, and the deterioration resistance to repeated loads and crack resistance to be obtained.

DESCRIPTION OF EMBODIMENTS

Hereinafter, specific embodiments of the present disclosure will be described in detail, but the present disclosure is not limited to the following embodiments.

A copolymer of the present disclosure contains tetrafluoroethylene (TFE) unit and a perfluoro(propyl vinyl ether) (PPVE) unit.

Bolts made of copolymers containing tetrafluoroethylene (TFE) unit and perfluoro(propyl vinyl ether) (PPVE) unit, due to being excellent in the heat resistance, the chemical resistance, the electric property, the non-stickiness, the self-lubricity and the like, are used in semiconductor production apparatuses, flat panel display production apparatuses, chemical plants and the like. However, when a conventional TFE-based copolymer as described in Patent Document 1 is used for a bolt, there are problems in that the bolt deforms particularly due to the use at high temperatures and the axial tension of the bolt gradually decreases, so that the bolt loosens. When the bolt of PFA can be produced by injection molding of PFA, PFA can be produced in high productivity, but in this case, PFA is required to have sufficient moldability to be filled in a mold in which a screw thread of a bolt is carved. However, PFA that has excellent moldability and enables bolts having suppressed deformation at high temperatures to be formed is not known.

It has been found that, by suitably regulating the content of PPVE unit, the melt flow rate (MFR) and the number of functional groups of the copolymer containing TFE unit and PPVE unit, there can be obtained the copolymer having excellent moldability that enables beautiful formed articles in various shapes to be obtained by an injection molding method, even when a mold to be used in molding has a low temperature. Further, it has also been found that, by using such a copolymer, there can be obtained the formed articles excellent in the abrasion resistance, the oxygen low permeability, the chemical solution low permeability, the creep resistance, the rigidity at high temperatures, and the deterioration resistance to repeated loads and crack resistance. By using the copolymer of the present disclosure, there can be obtained a bolt excellent in the abrasion resistance, the creep resistance, the rigidity at high temperatures, and the deterioration resistance to repeated loads and crack resistance, hardly loosens even when being used in a high temperature environment, and furthermore, hardly allows a chemical solution such as methyl ethyl ketone and oxygen to penetrate.

Further, by using the copolymer of the present disclosure, a coating layer uniform in thickness can be formed on a core wire having a small diameter. Thus, the copolymer of the present disclosure can be not only utilized as a material for the bolt, but also utilized in wide applications such as electric wire coatings.

The copolymer of the present disclosure is a melt-fabricable fluororesin. Being melt-fabricable means that a polymer can be melted and processed by using a conventional processing device such as an extruder or an injection molding machine.

The content of the PPVE unit of the copolymer is, with respect to the whole of the monomer units, 3.5 to 4.2% by mass. The content of the PPVE unit of the copolymer is more preferably 3.6% by mass or higher, and preferably 4.1% by mass or lower, and more preferably 4.0% by mass or lower. When the content of the PPVE unit of the copolymer is too small, it is difficult to obtain formed articles excellent in the abrasion resistance, and the deterioration resistance to repeated loads and crack resistance. When the content of the PPVE unit of the copolymer is too large, it is difficult to obtain formed articles excellent in the oxygen low permeability, the creep resistance and the rigidity at high temperatures.

The content of the TFE unit of the copolymer is, with respect to the whole of the monomer units, preferably 95.8 to 96.5% by mass, more preferably 95.9% by mass or higher, and still more preferably 96.0% by mass or higher, and more preferably 96.4% by mass or lower. When the content of the TFE unit of the copolymer is too large, it may be difficult to obtain formed articles excellent in the abrasion resistance and the deterioration resistance to repeated loads and crack resistance. When the content of the TFE unit of the copolymer is too small, it may be difficult to obtain formed articles excellent in the oxygen low permeability, the creep resistance and the rigidity at high temperatures.

In the present disclosure, the content of each monomer unit in the copolymer is measured by a $^{19}$F-NMR method.

The copolymer can also contain a monomer unit originated from a monomer copolymerizable with TFE and PPVE. In this case, the content of the monomer unit copolymerizable with TFE and PPVE is, with respect to the whole of the monomer units of the copolymer, preferably 0 to 1.0% by mass, more preferably 0.05 to 0.7% by mass and still more preferably 0.1 to 0.3% by mass.

The monomers copolymerizable with TFE and PPVE may include hexafluoropropylene (HFP), vinyl monomers represented by $CZ^1Z^2$=$CZ^3(CF_2)_nZ^4$ wherein $Z^1$, $Z^2$ and $Z^3$ are identical or different, and represent H or F; $Z^4$ represents H, F or Cl; and n represents an integer of 2 to 10, perfluoro (alkyl vinyl ether) [PAVE](provided that, PPVE is excluded) represented by $CF_2$=CF—$ORf^1$ wherein $Rf^1$ is a perfluoroalkyl group having 1 to 8 carbon atoms, and alkyl perfluorovinyl ether derivatives represented by $CF_2$=CF—$OCH_2$—$Rf^1$ wherein $Rf^1$ represents a perfluoroalkyl group having 1 to 5 carbon atoms. Among these, HFP is preferred.

The copolymer is preferably at least one selected from the group consisting of a copolymer consisting only of the TFE unit and the PPVE unit, and TFE/HFP/PPVE copolymer, and is more preferably a copolymer consisting only of the TFE unit and the PPVE unit.

The melt flow rate (MFR) of the copolymer is 18.0 to 22.0 g/10 min, and more preferably 21.9 g/10 min or lower. When the MFR is too low, the moldability of the copolymer deteriorates, and it is difficult to obtain formed articles excellent in the oxygen low permeability, the chemical solution low permeability and the rigidity at high temperatures. When the MFR is too high, it is difficult to obtain formed articles excellent in the abrasion resistance and the crack resistance. The melt flow rate (MFR) of the copolymer may be 18.0 to 20.0 g/10 min, or may be 20.0 to 22.0 g/10 min.

In the present disclosure, the MFR is a value obtained as a mass (g/10 min) of the polymer flowing out from a nozzle of 2.1 mm in inner diameter and 8 mm in length per 10 min at 372° C. under a load of 5 kg using a melt indexer, according to ASTM D1238.

The MFR can be regulated by regulating the kind and amount of a polymerization initiator to be used in polymerization of monomers, the kind and amount of a chain transfer agent, and the like.

In the present disclosure, the number of functional groups per $10^6$ main-chain carbon atoms of the copolymer is 50 or less. The number of functional groups per $10^6$ main-chain carbon atoms of the copolymer is preferably 40 or less, more preferably 30 or less, still more preferably 20 or less, further still more preferably 15 or less, especially preferably 10 or less and most preferably 6 or less. When the number of functional groups of the copolymer is too large, it may be difficult to obtain formed articles excellent in the oxygen low permeability, the chemical solution low permeability and the creep resistance.

For identification of the kind of the functional groups and measurement of the number of the functional groups, infrared spectroscopy can be used.

The number of the functional groups is measured, specifically, by the following method. First, the copolymer is formed by cold press to prepare a film of 0.25 to 0.30 mm in thickness. The film is analyzed by Fourier transform infrared spectroscopy to obtain an infrared absorption spectrum of the copolymer, and a difference spectrum against a base spectrum that is completely fluorinated and has no functional groups is obtained. From an absorption peak of a specific functional group observed on this difference spectrum, the number N of the functional group per $1\times10^6$ carbon atoms in the copolymer is calculated according to the following formula (A).

$$N=I\times K/t \quad (A)$$

I: absorbance
K: correction factor
t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

TABLE 1

| Functional Group | Absorption Frequency (cm$^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2$=$CF_2$ |

Absorption frequencies of —CH$_2$CF$_2$H, —CH$_2$COF, —CH$_2$COOH, —CH$_2$COOOCH$_3$ and —CH$_2$CONH$_2$ are lower by a few tens of kaysers (cm$^{-1}$) than those of —CF$_2$H, —COF, —COOH free and —COOH bonded, —COOCH$_3$ and —CONH$_2$ shown in the Table, respectively.

For example, the number of the functional group —COF is the total of the number of a functional group determined from an absorption peak having an absorption frequency of 1,883 cm$^{-1}$ derived from —CF$_2$COF and the number of a functional group determined from an absorption peak having an absorption frequency of 1,840 cm$^{-1}$ derived from —CH$_2$COF.

The functional groups are ones present on main chain terminals or side chain terminals of the copolymer, and ones present in the main chain or the side chains. The number of the functional groups may be the total of numbers of —CF=CF$_2$, —CF$_2$H, —COF, —COOH, —COOCH$_3$, —CONH$_2$ and —CH$_2$OH.

The functional groups are introduced to the copolymer by, for example, a chain transfer agent or a polymerization initiator used for production of the copolymer. For example, in the case of using an alcohol as the chain transfer agent, or a peroxide having a structure of —CH$_2$OH as the polymerization initiator, —CH$_2$OH is introduced on the main chain terminals of the copolymer. Alternatively, the functional group is introduced on the side chain terminal of the copolymer by polymerizing a monomer having the functional group.

The copolymer satisfying the above range regarding the number of functional groups can be obtained by subjecting the copolymer to a fluorination treatment. That is, the copolymer of the present disclosure is preferably one which is subjected to the fluorination treatment. Further, the copolymer of the present disclosure preferably has —CF$_3$ terminal groups.

The melting point of the copolymer is preferably 295 to 315° C., more preferably 300° C. or higher, still more preferably 302° C. or higher, especially preferably 303° C. or higher, and most preferably 304° C. or higher, and more preferably 310° C. or lower. Due to that the melting point is in the above range, there can be obtained the copolymer giving formed articles particularly better in the mechanical property at high temperatures and the sealability at high temperatures.

In the present disclosure, the melting point can be measured by using a differential scanning calorimeter [DSC].

The oxygen permeation coefficient of the copolymer is preferably 680 cm$^3$·mm/(m$^2$·24 h·atm) or lower. Due to that the content of the PPVE unit, the melt flow rate (MFR) and the number of functional groups of the copolymer containing the TFE unit and the PPVE unit are suitably regulated, the copolymer of the present disclosure has an excellent oxygen low permeability.

In the present disclosure, the oxygen permeation coefficient can be measured under the condition of a test temperature of 70° C. and a test humidity of 0% RH. Specific measurement of the oxygen permeation coefficient can be carried out by a method described in Examples.

The methyl ethyl ketone (MEK) permeability of the copolymer is preferably 61.0 mg·cm/m$^2$·day or lower. Due to that the content of the PPVE unit, the melt flow rate (MFR) and the number of functional groups of the copolymer containing the TFE unit and the PPVE unit are suitably regulated, the copolymer of the present disclosure has an excellent MEK low permeability. That is, by using the copolymer of the present disclosure, formed articles that hardly allow a chemical solution such as MEK to permeate can be obtained.

In the present disclosure, the MEK permeability can be measured under the condition of a temperature of 60° C. and for 60 days. Specific measurement of the MEK permeability can be carried out by a method described in Examples.

The copolymer of the present disclosure can be produced by a polymerization method such as suspension polymerization, solution polymerization, emulsion polymerization or bulk polymerization. The polymerization method is preferably emulsion polymerization or suspension polymerization. In these polymerization methods, conditions such as temperature and pressure, and a polymerization initiator and other additives can suitably be set depending on the formulation and the amount of the copolymer.

As the polymerization initiator, an oil-soluble radical polymerization initiator, or a water-soluble radical polymerization initiator may be used.

The oil-soluble radical polymerization initiator may be a known oil-soluble peroxide, and examples thereof typically include:

dialkyl peroxycarbonates such as di-n-propyl peroxydicarbonate, diisopropyl peroxydicarbonate, di-sec-butyl peroxydicarbonate and di-2-ethoxyethyl peroxydicarbonate;

peroxyesters such as t-butyl peroxyisobutyrate and t-butyl peroxypivalate;

dialkyl peroxides such as di-t-butyl peroxide; and di[fluoro(or fluorochloro)acyl] peroxides.

The di[fluoro(or fluorochloro)acyl] peroxides include diacyl peroxides represented by [(RfCOO)—]$_2$ wherein Rf is a perfluoroalkyl group, an ω-hydroperfluoroalkyl group or a fluorochloroalkyl group.

Examples of the di[fluoro(or fluorochloro)acyl]peroxides include di(ω-hydro-dodecafluorohexanoyl) peroxide, di(ω-hydro-tetradecafluoroheptanoyl) peroxide, di(ω-hydrohexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydrododecafluoroheptanoyl-ω-hydrohexadecafluorononanoyl peroxide, ω-chloro-hexafluorobutyryl-ω-chlorodecafluorohexanoyl peroxide, ω-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorotriacontafluorodocosanoyl) peroxide.

The water-soluble radical polymerization initiator may be a known water-soluble peroxide, and examples thereof include ammonium salts, potassium salts and sodium salts of persulfuric acid, perboric acid, perchloric acid, perphosphoric acid, percarbonic acid and the like, organic peroxides such as disuccinoyl peroxide and diglutaroyl peroxide, and t-butyl permaleate and t-butyl hydroperoxide. A reductant such as a sulfite salt may be combined with a peroxide and used, and the amount thereof to be used may be 0.1 to 20 times with respect to the peroxide.

In the polymerization, a surfactant, a chain transfer agent and a solvent may be used, which are conventionally known.

The surfactant may be a known surfactant, for example, nonionic surfactants, anionic surfactants and cationic surfactants may be used. Among these, fluorine-containing anionic surfactants are preferred, and more preferred are linear or branched fluorine-containing anionic surfactants having 4 to 20 carbon atoms, which may contain an ether bond oxygen (that is, an oxygen atom may be inserted between carbon atoms). The amount of the surfactant to be added (with respect to water in the polymerization) is preferably 50 to 5,000 ppm.

Examples of the chain transfer agent include hydrocarbons such as ethane, isopentane, n-hexane and cyclohexane; aromatics such as toluene and xylene; ketones such as acetone; acetate esters such as ethyl acetate and butyl acetate; alcohols such as methanol and ethanol; mercaptans such as methylmercaptan; and halogenated hydrocarbons such as carbon tetrachloride, chloroform, methylene chloride and methyl chloride. The amount of the chain transfer agent to be added may vary depending on the chain transfer constant value of the compound to be used, but is usually in the range of 0.01 to 20% by mass with respect to the solvent in the polymerization.

The solvent may include water and mixed solvents of water and an alcohol.

In the suspension polymerization, in addition to water, a fluorosolvent may be used. The fluorosolvent may include hydrochlorofluoroalkanes such as $CH_3CClF_2$, $CH_3CCl_2F$, $CF_3CF_2CCl_2H$ and $CF_2ClCF_2CFHCl$; chlorofluoroalaknes such as $CF_2ClCFClCF_2CF_3$ and $CF_3CFClCFClCF_3$; hydrofluroalkanes such as $CF_3CFHCFHCF_2CF_2CF_3$, $CF_2HCF_2CF_2CF_2CF_2H$ and $CF_3CF_2CF_2CF_2CF_2CF_2H$; hydrofluoroethers such as $CH_3OC_2F_5$, $CH_3OC_3F_5CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$ and $CF_3CHFCF_{2O}CH_2CF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, and among these, perfluoroalkanes are preferred. The amount of the fluorosolvent to be used is, from the viewpoint of the suspensibility and the economic efficiency, preferably 10 to 100% by mass with respect to an aqueous medium.

The polymerization temperature is not limited, and may be 0 to 100° C. The polymerization pressure is suitably set depending on other polymerization conditions to be used such as the kind, the amount and the vapor pressure of the solvent, and the polymerization temperature, but may usually be 0 to 9.8 MPaG.

In the case of obtaining an aqueous dispersion containing the copolymer by the polymerization reaction, the copolymer can be recovered by coagulating, cleaning and drying the copolymer contained in the aqueous dispersion. Then in the case of obtaining the copolymer as a slurry by the polymerization reaction, the copolymer can be recovered by taking out the slurry from a reaction container, and cleaning and drying the slurry. The copolymer can be recovered in a shape of powder by the drying.

The copolymer obtained by the polymerization may be formed into pellets. A method of forming into pellets is not limited, and a conventionally known method can be used. Examples thereof include methods of melt extruding the copolymer by using a single-screw extruder, a twin-screw extruder or a tandem extruder and cutting the resultant into a predetermined length to form the copolymer into pellets. The extrusion temperature in the melt extrusion needs to be varied depending on the melt viscosity and the production method of the copolymer, and is preferably the melting point of the copolymer+20° C. to the melting point of the copolymer+140° C. A method of cutting the copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water of 30 to 200° C., steam of 100 to 200° C. or hot air of 40 to 200° C.

Alternatively, the copolymer obtained by the polymerization may be subjected to fluorination treatment. The fluorination treatment can be carried out by bringing the copolymer having been subjected to no fluorination treatment into contact with a fluorine-containing compound. By the fluorination treatment, thermally unstable functional groups of the copolymer, such as —COOH, —COOCH$_3$, —CH$_2$OH, —COF, —CF=CF$_2$ and —CONH$_2$, and thermally relatively stable functional groups thereof, such as —CF$_2$H, can be converted to thermally very stable —CF$_3$. Consequently, the total number (number of functional groups) of —COOH, —COOCH$_3$, —CH$_2$OH, —COF, —CF=CF$_2$, —CONH$_2$ and —CF$_2$H of the copolymer can easily be controlled in the above-mentioned range.

The fluorine-containing compound is not limited, but includes fluorine radical sources generating fluorine radicals under the fluorination treatment condition. The fluorine radical sources include F$_2$ gas, CoF$_3$, AgF$_2$, UF$_6$, OF$_2$, N$_2$F$_2$, CF$_3$OF, halogen fluorides (for example, IF$_5$ and ClF$_3$).

The fluorine radical source such as F$_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas includes nitrogen gas, helium gas and argon gas, but from the viewpoint of the economic efficiency, nitrogen gas is preferred.

The condition of the fluorination treatment is not limited, and the copolymer in a melted state may be brought into contact with the fluorine-containing compound, but the fluorination treatment can be carried out usually at a temperature of not higher than the melting point of the copolymer, preferably at 20 to 240° C. and more preferably at 100 to 220° C. The fluorination treatment is carried out usually for 1 to 30 hours and preferably 5 to 25 hours. The fluorination treatment is preferred which brings the copolymer having been subjected to no fluorination treatment into contact with fluorine gas (F$_2$ gas).

A composition may be obtained by mixing the copolymer of the present disclosure and as required, other components. The other components include fillers, plasticizers, processing aids, mold release agents, pigments, flame retarders, lubricants, light stabilizers, weathering stabilizers, electrically conductive agents, antistatic agents, ultraviolet absorbents, antioxidants, foaming agents, perfumes, oils, softening agents and dehydrofluorination agents.

Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube and glass fiber. The electrically conductive agents include carbon black. The plasticizers include dioctyl phthalate and pentaerythritol. The processing aids include carnauba wax, sulfone compounds, low molecular weight polyethylene and fluorine-based auxiliary agents. The dehydrofluorination agents include organic oniums and amidines.

As the above-mentioned other components, other polymers other than the copolymer may be used. The other polymers include fluororesins other than the copolymer, fluoroelastomer, and non-fluorinated polymers.

A method of producing the composition includes a method of dry mixing the copolymer and the other components, and a method of previously mixing the copolymer and the other components by a mixer and then melt kneading the mixture by a kneader, melt extruder or the like.

The copolymer of the present disclosure or the above-mentioned composition can be used as a processing aid, a molding material and the like, and is suitably used as a molding material. There can also be utilized aqueous dispersions, solutions and suspensions of the copolymer of the present disclosure, and the copolymer/solvent-based materials; and these can be used for application of coating materials, encapsulation, impregnation, and casting of films. However, since the copolymer of the present disclosure has the above-mentioned properties, it is preferable to use the copolymer as the molding material.

Formed articles may be obtained by forming the copolymer of the present disclosure or the above composition.

A method of forming the copolymer or the composition is not limited, and includes injection molding, extrusion forming, compression molding, blow molding, transfer molding, rotomolding and rotolining molding. As the forming method, among these, preferable are extrusion forming, compression molding, injection molding and transfer molding; from the viewpoint of being able to produce forming articles in a high productivity, more preferable are injection molding, extrusion forming and transfer molding, and still more preferable is injection molding. That is, it is preferable that formed articles are extrusion formed articles, compression molded articles, injection molded articles or transfer molded articles; and from the viewpoint of being able to produce formed articles in a high productivity, being injection molded articles, extrusion formed articles or transfer molded articles is more preferable, and being injection molded articles is still more preferable. By forming the copolymer of the present disclosure by an injection molding method, beautiful formed articles in various shapes can be obtained, even when a mold to be used in molding has a low temperature.

The formed articles containing the copolymer of the present disclosure may be, for example, nuts, bolts, joints, films, bottles, gaskets, electric wire coatings, tubes, hoses, pipes, valves, sheets, seals, packings, tanks, rollers, containers, cocks, connectors, filter housings, filter cages, flowmeters, pumps, wafer carrier, or wafer boxes.

The copolymer of the present disclosure, the above composition and the above formed articles can be used, for example, in the following applications.

Food packaging films, and members for liquid transfer for food production apparatuses, such as lining materials of liquid transfer lines, packings, sealing materials and sheets, used in food production processes;

chemical stoppers and packaging films for chemicals, and members for chemical solution transfer, such as lining materials of liquid transfer lines, packings, sealing materials and sheets, used in chemical production processes;

inner surface lining materials of chemical solution tanks and piping of chemical plants and semiconductor factories; members for fuel transfer, such as O (square) rings, tubes, packings, valve stem materials, hoses and sealing materials, used in fuel systems and peripheral equipment of automobiles, and such as hoses and sealing materials, used in ATs of automobiles;

members used in engines and peripheral equipment of automobiles, such as flange gaskets of carburetors, shaft seals, valve stem seals, sealing materials and hoses, and other vehicular members such as brake hoses, hoses for air conditioners, hoses for radiators, and electric wire coating materials;

members for chemical transfer for semiconductor production apparatuses, such as O (square) rings, tubes, packings, valve stem materials, hoses, sealing materials, rolls, gaskets, diaphragms and joints;

members for coating and inks, such as coating rolls, hoses and tubes, for coating facilities, and containers for inks;

members for food and beverage transfer, such as tubes, hoses, belts, packings and joints for food and beverage, food packaging materials, and members for glass cooking appliances;

members for waste liquid transport, such as tubes and hoses for waste liquid transport;

members for high-temperature liquid transport, such as tubes and hoses for high-temperature liquid transport;

members for steam piping, such as tubes and hoses for steam piping;

corrosion proof tapes for piping, such as tapes wound on piping of decks and the like of ships;

various coating materials, such as electric wire coating materials, optical fiber coating materials, and transparent front side coating materials installed on the light incident side and back side lining materials of photo-electromotive elements of solar cells;

diaphragms and sliding members such as various types of packings of diaphragm pumps;

films for agriculture, and weathering covers for various kinds of roof materials, sidewalls and the like;

interior materials used in the building field, and coating materials for glasses such as non-flammable fireproof safety glasses; and lining materials for laminate steel sheets used in the household electric field.

The fuel transfer members used in fuel systems of automobiles further include fuel hoses, filler hoses and evap hoses. The above fuel transfer members can also be used as fuel transfer members for gasoline additive-containing fuels, resultant to sour gasoline, resultant to alcohols, and resultant to methyl tertiary butyl ether and amines and the like.

The above chemical stoppers and packaging films for chemicals have excellent chemical resistance to acids and the like. The above chemical solution transfer members also include corrosion proof tapes wound on chemical plant pipes.

The above formed articles also include vehicular radiator tanks, chemical solution tanks, bellows, spacers, rollers and gasoline tanks, waste liquid transport containers, high-temperature liquid transport containers and fishery and fish farming tanks.

The above formed articles further include members used for vehicular bumpers, door trims and instrument panels, food processing apparatuses, cooking devices, water- and oil-repellent glasses, illumination-related apparatuses, display boards and housings of QA devices, electrically illuminated billboards, displays, liquid crystal displays, cell phones, printed circuit boards, electric and electronic components, sundry goods, dust bins, bathtubs, unit baths, ventilating fans, illumination frames and the like.

Due to that the formed articles containing the copolymer of the present disclosure are excellent in the abrasion resistance, the oxygen low permeability, the chemical solution low permeability, the creep resistance, the rigidity at high temperatures, and the deterioration resistance to repeated loads and crack resistance, the formed articles can suitably be utilized for nuts, bolts, joints, packings, valves, cocks, connectors, filter housings, filter cages, filter cages, flowmeters, pumps, and the like. For example, the formed articles can suitably be utilized as piping members (in particular, joints) to be used in the transfer of chemical solutions and flowmeter housings provided with flow paths for chemical solutions in flowmeters. The piping members and flowmeter housings of the present disclosure are excellent in the abrasion resistance, the oxygen low permeability, the chemical solution low permeability, the creep resistance, the rigidity at high temperatures, and the deterioration resistance to repeated loads and crack resistance. Hence, the piping members and flowmeter housings of the present disclosure can be suitably used in the measurement of the flow rate of the chemical solution at 80° C. or higher and are hardly damaged even when chemical agents are allowed to flow.

Due to that the formed articles containing the copolymer of the present disclosure can be produced by an injection molding method and are excellent in the abrasion resistance, the oxygen low permeability, the chemical solution low permeability, the creep resistance, the rigidity at high temperatures, and the deterioration resistance to repeated loads and crack resistance, the formed articles can suitably be utilized as members to be compressed such as gaskets and packings.

The members to be compressed of the present disclosure can be used in a state of being compressed at a compression deformation rate of 10% or higher, and can be used in a state of being compressed at a compression deformation rate of 20% or higher or 25% or higher. By using the members to be compressed of the present disclosure by being deformed at such a high compression deformation rate, a certain rebound resilience can be retained for a long term and the sealing property and the insulating property can be retained for a long term.

The members to be compressed of the present disclosure can be used at 150° C. or higher and in a state of being compression deformed at a compression deformation rate of 10% or higher, and can be used at 150° C. or higher and in a state of being compression deformed at a compression deformation rate of 20% or higher or 25% or higher. By using the members to be compressed of the present disclosure by being deformed at such a high temperature and at such a high compression deformation rate, a certain rebound resilience can be retained also at high temperatures for a long term and the sealing property and the insulating property at high temperatures can be retained for a long term.

In the case where the members to be compressed are used in a state of being compressed, the compression deformation rate is a compression deformation rate of a portion having the highest compression deformation rate. For example, in the case where a flat member to be compressed is used in a state of being compressed in the thickness direction, the compression deformation rate is that in the thickness direction. Further for example, in the case where a member to be compressed is used with only some portions of the member in a state of being compressed, the compression deformation rate is that of a portion having the highest compression deformation rate among compression deformation rates of the compressed portions.

The size and shape of the members to be compressed of the present disclosure may suitably be set according to applications, and are not limited. The shape of the members to be compressed of the present disclosure may be, for example, annular. The members to be compressed of the present disclosure may also have, in plan view, a circular shape, an elliptic shape, a corner-rounded square or the like, and may be a shape having a throughhole in the central portion thereof.

It is preferable that the members to be compressed of the present disclosure are used as members constituting non-aqueous electrolyte batteries. The members to be compressed of the present disclosure are especially suitable as members used in a state of contacting with a non-aqueous electrolyte in the non-aqueous electrolyte batteries. That is, the members to be compressed of the present disclosure may also be ones having a liquid-contact surface with a non-aqueous electrolyte in the non-aqueous electrolyte batteries.

The non-aqueous electrolyte batteries are not limited as long as being batteries having a non-aqueous electrolyte, and examples thereof include lithium ion secondary batteries and lithium ion capacitors. Members constituting the non-aqueous electrolyte batteries include sealing members and insulating members.

For the non-aqueous electrolyte, one or two or more of well-known solvents can be used such as propylene carbonate, ethylene carbonate, butylene carbonate, γ-butyllactone, 1,2-dimethoxyethane, 1,2-diethoxyethane, dimethyl carbonate, diethyl carbonate and ethyl methyl carbonate. The non-aqueous electrolyte batteries may further have an electrolyte. The electrolyte is not limited, but may be $LiClO_4$, $LiAsF_6$, $LiPF_6$, $LiBF_4$, $LiCl$, $LiBr$, $CH_3SO_3Li$, $CF_3SO_3Li$, cesium carbonate and the like.

The members to be compressed of the present disclosure can suitably be utilized, for example, as sealing members such as sealing gaskets and sealing packings, and insulating members such as insulating gaskets and insulating packings. The sealing members are members to be used for preventing leakage of a liquid or a gas, or penetration of a liquid or a gas from the outside. The insulating members are members to be used for insulating electricity. The members to be compressed of the present disclosure may also be members to be used for the purpose of both of sealing and insulation.

The members to be compressed of the present disclosure, due to being excellent in the creep resistance, the rigidity at high temperatures, and the deterioration resistance to repeated loads and crack resistance, can suitably be used under an environment of becoming high temperatures. It is suitable for the members to be compressed of the present disclosure to be used, for example, in an environment where the maximum temperature becomes 40° C. or higher. It is suitable for the members to be compressed of the present disclosure to be used, for example, in an environment where the maximum temperature becomes 95° C. or higher. Examples of the case where the temperature of the members to be compressed of the present disclosure may become such high temperatures include the case where after a member to be compressed is installed in a state of being compressed to a battery, other battery members are installed to the battery by welding, and the case where a non-aqueous electrolyte battery generates heat.

The members to be compressed of the present disclosure can suitably be used as sealing members for non-aqueous electrolyte batteries or insulating members for non-aqueous electrolyte batteries. For example, in the charge time of batteries such as non-aqueous electrolyte secondary batteries, the temperature of the batteries temporarily becomes 40° C. or higher, specially temporarily becomes 150° C. or higher in some cases. Even when the members to be compressed of the present disclosure are used by being deformed at high temperatures and at a high compression deformation rate, and moreover are brought into contact with non-aqueous electrolytes at high temperatures, in batteries such as non-aqueous electrolyte batteries, a high rebound resilience is not impaired. Therefore, the members to be compressed of the present disclosure, in the case of being used as sealing members, have the excellent sealing property and also at high temperatures, retain the sealing property for a long term. Further, the members to be compressed of the present disclosure, due to containing the above copolymer, have the excellent insulating property. Therefore, in the case of using the members to be compressed of the present disclosure as insulating members, the member firmly adhere to two or more electrically conductive members and prevent short circuit over a long term.

Due to that the formation of the copolymer of the present disclosure by an extrusion forming method enables a thin coating layer to be formed on a core wire having a small diameter, at a high take-over speed without causing the coating breakage, even when the diameter of the core wire is small, the copolymer of the present disclosure can be suitably utilized as a material for forming electric wire coatings. Therefore, due to that the coated electric wire having a coating layer comprising the copolymer of the present disclosure has almost no variation in the outer diameter, even when the diameter of the core wire is small, the coated electric wire is excellent in the electric property.

The coated electric wire has a core wire, and the coating layer installed on the periphery of the core wire and containing the copolymer of the present disclosure. For example, an extrusion formed article made by melt extruding the copolymer in the present disclosure on a core wire can be made into the coating layer.

As a material for the core wire, for example, a metal conductor material such as copper or aluminum can be used. The core wire is preferably one having a diameter of 0.02 to 3 mm. The diameter of the core wire is more preferably 0.04 mm or larger, still more preferably 0.05 mm or larger and especially preferably 0.1 mm or larger. The diameter of the core wire is more preferably 2 mm or smaller.

With regard to specific examples of the core wire, there may be used, for example, AWG (American Wire Gauge)-46 (solid copper wire of 40 μm in diameter), AWG-26 (solid copper wire of 404 μm in diameter), AWG-24 (solid copper wire of 510 μm in diameter), and AWG-22 (solid copper wire of 635 μm in diameter).

The coating layer is preferably one having a thickness of 0.1 to 3.0 mm. It is also preferable that the thickness of the coating layer is 2.0 mm or smaller.

The high-frequency transmission cables include coaxial cables. The coaxial cables generally have a structure configured by laminating an inner conductor, an insulating coating layer, an outer conductor layer and a protective coating layer in order from the core part to the peripheral part. A formed article containing the copolymer of the present disclosure can suitably be utilized as the insulating coating layer containing the copolymer. The thickness of each layer in the above structure is not limited, but is usually: the diameter of the inner conductor is approximately 0.1 to 3 mm; the thickness of the insulating coating layer is approximately 0.3 to 3 mm; the thickness of the outer conductor layer is approximately 0.5 to 10 mm; and the thickness of the protective coating layer is approximately 0.5 to 2 mm.

Alternatively, the coating layer may be one containing cells, and is preferably one in which cells are homogeneously distributed.

The average cell size of the cells is not limited, but is, for example, preferably 60 μm or smaller, more preferably 45 μm or smaller, still more preferably 35 μm or smaller, further still more preferably 30 μm or smaller, especially preferably 25 μm or smaller and further especially preferably 23 μm or smaller. Then, the average cell size is preferably 0.1 μm or larger and more preferably 1 μm or larger. The average cell size can be determined by taking an electron microscopic image of an electric wire cross section, calculating the diameter of each cell and averaging the diameters.

The foaming ratio of the coating layer may be 20% or higher, and is more preferably 30% or higher, still more preferably 33% or higher and further still more preferably 35% or higher. The upper limit is not limited, but is, for example, 80%. The upper limit of the foaming ratio may be 60%. The foaming ratio is a value determined as ((the specific gravity of an electric wire coating material–the specific gravity of the coating layer)/(the specific gravity of the electric wire coating material)×100. The foaming ratio can suitably be regulated according to applications, for example, by regulation of the amount of a gas, described later, to be injected in an extruder, or by selection of the kind of a gas dissolving.

Alternatively, the coated electric wire may have another layer between the core wire and the coating layer, and may further have another layer (outer layer) on the periphery of the coating layer. In the case where the coating layer contains cells, the electric wire of the present disclosure may be of a two-layer structure (skin-foam) in which a non-foaming layer is inserted between the core wire and the coating layer, a two-layer structure (foam-skin) in which a non-foaming layer is coated as the outer layer, or a three-layer structure (skin-foam-skin) in which a non-foaming layer is coated as the outer layer of the skin-foam structure. The non-foaming layer is not limited, and may be a resin layer composed of a resin, such as a TFE/HFP-based copolymer, a TFE/PAVE copolymer, a TFE/ethylene-based copolymer, a vinylidene fluoride-based polymer, a polyolefin resin such as polyethylene [PE], or polyvinyl chloride [PVC].

The coated electric wire can be produced, for example, by using an extruder, heating the copolymer, extruding the copolymer in a melt state on the core wire to thereby form the coating layer.

In formation of a coating layer, by heating the copolymer and introducing a gas in the copolymer in a melt state, the coating layer containing cells can be formed. As the gas, there can be used, for example, a gas such as chlorodifluoromethane, nitrogen or carbon dioxide, or a mixture thereof. The gas may be introduced as a pressurized gas in the heated copolymer, or may be generated by mingling a chemical foaming agent in the copolymer. The gas dissolves in the copolymer in a melt state.

The copolymer of the present disclosure can suitably be utilized as a material for products for high-frequency signal transmission.

The products for high-frequency signal transmission are not limited as long as being products to be used for transmission of high-frequency signals, and include (1) formed boards such as insulating boards for high-frequency circuits, insulating materials for connection parts and printed circuit boards, (2) formed articles such as bases of high-frequency vacuum tubes and antenna covers, and (3) coated electric wires such as coaxial cables and LAN cables. The products for high-frequency signal transmission can suitably be used in devices utilizing microwaves, particularly microwaves of 3 to 30 GHz, in satellite communication devices, cell phone base stations, and the like.

In the products for high-frequency signal transmission, the copolymer of the present disclosure can suitably be used as an insulator in that the dielectric loss tangent is low.

As the (1) formed boards, printed wiring boards are preferable in that the good electric property is provided. The printed wiring boards are not limited, but examples thereof include printed wiring boards of electronic circuits for cell phones, various computers, communication devices and the like. As the (2) formed articles, antenna covers are preferable in that the dielectric loss is low.

By forming the copolymer of the present disclosure by an injection molding method, beautiful formed articles in various shapes can be obtained in high productivity. The formed articles containing the copolymer of the present disclosure are excellent in the abrasion resistance, the oxygen low permeability, the chemical solution low permeability, the creep resistance, the rigidity at high temperatures, and the deterioration resistance to repeated loads and crack resistance. Therefore, the formed articles containing the copolymer of the present disclosure can suitably be utilized as films or sheets.

The films of the present disclosure are useful as release films. The release films can be produced by forming the copolymer of the present disclosure by melt extrusion forming, calendering, press molding, casting or the like. From the viewpoint that uniform thin films can be obtained, the release films can be produced by melt extrusion forming.

The films of the present disclosure can be applied to the surface of rolls used in QA devices. The copolymer of the present disclosure is formed into needed shapes by extrusion forming, compression molding, press molding or the like to be formed into sheet-shapes, filmy shapes or tubular shapes, and can be used as surface materials for QA device rolls, QA device belts or the like. Thin-wall tubes and films can be produced particularly by a melt extrusion forming method.

Due to that the formed articles containing the copolymer of the present disclosure are excellent in the abrasion resistance, the oxygen low permeability, the chemical solution low permeability, creep resistance, the rigidity at high temperatures, and the deterioration resistance to repeated loads and crack resistance, the formed articles can suitably be utilized as bottles or tubes. The bottles or tubes of the present disclosure are hardly damaged during use.

The copolymers of the present disclosure can be formed into beautiful formed articles in various shapes by an injection molding method, even when a mold to be used in molding has a low temperature. Further, due to that the formed articles to be obtained are excellent in the abrasion resistance, the oxygen low permeability, the chemical solution low permeability, creep resistance, the rigidity at high temperatures, and the deterioration resistance to repeated loads and crack resistance, the formed articles can suitably be utilized as valves. The valves containing the copolymer of the present disclosure can be produced in high productivity and are excellent in the abrasion resistance, the oxygen low permeability, the chemical solution low permeability, creep resistance, the rigidity at high temperatures, and the deterioration resistance to repeated loads and crack resistance. The valves of the present disclosure, due to being excellent in the abrasion resistance, the oxygen low permeability, the chemical solution low permeability, creep resistance, the rigidity at high temperatures, and the deterioration resistance to repeated loads and crack resistance, can suitably be used, for example, to control the fluid at 80° C. or higher, in particular about 95° C. At least liquid contact part of the valves of the present disclosure can be composed of the above copolymer. The valves of the present disclosure may be ones provided with a housing containing the above copolymer.

Although the embodiments have been described above, it will be understood that various changes in form and details are possible without departing from the gist and scope of the claims.

According to the present disclosure, there is provided a copolymer containing tetrafluoroethylene unit and perfluoro (propyl vinyl ether) unit, wherein the copolymer has a content of perfluoro(propyl vinyl ether) unit of 3.5 to 4.2% by mass with respect to the whole of the monomer units, a melt flow rate at 372° C. of 18.0 to 22.0 g/10 min, and the number of functional groups of 50 or less per $10^6$ main-chain carbon atoms.

According to the present disclosure, an injection molded article comprising the above copolymer is further provided.

According to the present disclosure, a coated electric wire having a coating layer comprising the above copolymer is further provided.

According to the present disclosure, there is provided a formed article containing the above copolymer, wherein the formed article is a bolt, a member to be compressed, a bottle, or an electric wire coating.

EXAMPLES

Next, embodiments of the present disclosure will be described with reference to examples, but the present disclosure is not intended to be limited by these examples.

The numerical values of the Examples were measured by the following methods.

(Content of a Monomer Unit)

The content of each monomer unit was measured by an NMR analyzer (for example, manufactured by Bruker BioSpin GmbH, AVANCE 300, high-temperature probe).

(Melt Flow Rate (MFR))

The polymer was made to flow out from a nozzle of 2.1 mm in inner diameter and 8 mm in length at 372° C. under a load of 5 kg by using a Melt Indexer G-01 (manufactured by Toyo Seiki Seisaku-sho, Ltd.) according to ASTM D1238, and the mass (g/10 min) of the polymer flowing out per 10 min was determined.

(Number of Functional Groups)

Pellets of the copolymer was formed by cold press into a film of 0.25 to 0.30 mm in thickness. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that is completely fluorinated and has no functional groups is obtained. From an absorption peak of a specific functional group observed on this difference spectrum, the number N of the functional group per $1 \times 10^6$ carbon atoms in the sample was calculated according to the following formula (A).

$$N = I \times K / t \qquad (A)$$

I: absorbance
K: correction factor
t: thickness of film (mm)

Regarding the functional groups in the present disclosure, for reference, the absorption frequency, the molar absorption coefficient and the correction factor are shown in Table 2. The molar absorption coefficients are those determined from FT-IR measurement data of low molecular model compounds.

TABLE 2

| Functional Group | Absorption Frequency (cm$^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2=CF_2$ |

(Melting Point)

The polymer was heated, as a first temperature raising step at a temperature-increasing rate of 10° C./min from 200° C. to 350° C., then cooled at a cooling rate of 10° C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corp.); and the melting point was determined from a melting curve peak observed in the second temperature raising step.

Comparative Example 1

51.8 L of pure water was charged in a 174 L-volume autoclave; nitrogen replacement was sufficiently carried out; thereafter, 40.9 kg of perfluorocyclobutane, 2.05 kg of perfluoro(propyl vinyl ether) (PPVE) and 0.33 kg of methanol were charged; and the temperature in the system was held at 35° C. and the stirring speed was held at 200 rpm. Then, tetrafluoroethylene (TFE) was introduced under pressure up to 0.64 MPa, and thereafter 0.103 kg of a 50% methanol solution of di-n-propyl peroxydicarbonate was charged to initiate polymerization. Since the pressure in the system decreased along with the progress of the polymerization, TFE was continuously supplied to make the pressure constant, and 0.046 kg of PPVE was additionally charged for every 1 kg of TFE supplied. The polymerization was finished at the time when the amount of TFE additionally charged reached 40.9 kg. Unreacted TFE was released to return the pressure in the autoclave to the atmospheric pressure, and thereafter, an obtained reaction product was washed with water and dried to thereby obtain 42.8 kg of a powder.

The obtained powder was melt extruded at 360° C. by a screw extruder (trade name: PCM46, manufactured by Ikegai Corp.) to thereby obtain pellets of a TFE/PPVE copolymer. By using the obtained pellets, the PPVE content was measured by the above-mentioned method.

The obtained pellets were put in a vacuum vibration-type reactor VVD-30 (manufactured by Okawara MFG. Co., Ltd.), and heated to 210° C. After vacuumizing, F$_2$ gas diluted to 20% by volume with N$_2$ gas was introduced to the atmospheric pressure. 0.5 hour after the F$_2$ gas introduction, vacuumizing was once carried out and the F$_2$ gas was again introduced. Further, 0.5 hour thereafter, vacuumizing was again carried out and F$_2$ gas was again introduced. Thereafter, while the above operation of the F$_2$ gas introduction and the vacuumizing was carried out once every 1 hour, the reaction was carried out at a temperature of 210° C. for 10 hours. After the reaction was finished, the reactor interior was replaced sufficiently by N$_2$ gas to finish the fluorination reaction. By using the fluorinated pellets, the above physical properties were measured by the methods described above.

Comparative Example 2

Fluorinated pellets were obtained as in Comparative Example 1, except for changing the charged amount of PPVE to 1.92 kg, changing the charged amount of methanol to 4.79 kg, changing the charged amount of the 50% methanol solution of di-n-propyl peroxydicarbonate to 0.051 kg, and changing the additionally charged amount of PPVE for every 1 kg of TFE supplied to 0.044 kg to obtain 42.7 kg of dry powder.

Comparative Example 3

Fluorinated pellets were obtained as in Comparative Example 1, except for changing the charged amount of PPVE to 1.79 kg, changing the charged amount of methanol to 0.71 kg, and adding 0.042 kg of PPVE for every 1 kg of TFE supplied, to thereby obtain 42.6 kg of a powder.

Comparative Example 4

Fluorinated pellets were obtained as in Comparative Example 1, except for changing the charged amount of PPVE to 1.73 kg, changing the charged amount of methanol to 2.27 kg, and adding 0.041 kg of PPVE for every 1 kg of TFE supplied, to thereby obtain 42.6 kg of a powder.

Comparative Example 5

Non-fluorinated pellets were obtained as in Comparative Example 1, except for changing the charged amount of PPVE to 1.79 kg, changing the charged amount of methanol to 2.14 kg, and adding 0.042 kg of PPVE for every 1 kg of TFE supplied, to thereby obtain 42.6 kg of a powder.

Comparative Example 6

Fluorinated pellets were obtained as in Comparative Example 1, except for changing the charged amount of methanol to 0.98 kg.

Comparative Example 7

Fluorinated pellets were obtained as in Comparative Example 1, except for changing the charged amount of PPVE to 1.36 kg, changing the charged amount of methanol to 2.79 kg, adding 0.034 kg of PPVE for every 1 kg of TFE supplied, changing the raised temperature of the vacuum vibration-type reactor to 170° C., and changing the reaction condition to at 170° C. and for 5 hours, to thereby obtain 42.3 kg of a powder.

Example 1

Fluorinated pellets were obtained as in Comparative Example 1, except for changing the charged amount of PPVE to 1.53 kg, changing the charged amount of methanol to 1.68 kg, adding 0.037 kg of PPVE for every 1 kg of TFE supplied, changing the raised temperature of the vacuum vibration-type reactor to 180° C., and changing the reaction condition to at 180° C. and for 10 hours, to thereby obtain 42.4 kg of a powder.

Example 2

Fluorinated pellets were obtained as in Comparative Example 1, except for changing the charged amount of PPVE to 1.66 kg, changing the charged amount of methanol to 1.65 kg, and adding 0.040 kg of PPVE for every 1 kg of TFE supplied, to thereby obtain 42.5 kg of a powder.

Example 3

Fluorinated pellets were obtained as in Comparative Example 1, except for changing the charged amount of PPVE to 1.79 kg, changing the charged amount of methanol to 1.84 kg, and adding 0.042 kg of PPVE for every 1 kg of TFE supplied, to thereby obtain 42.6 kg of a powder.

By using the pellets obtained in Examples and Comparative Examples, the above physical properties were measured by the methods described above. The results are shown in Table 3.

TABLE 3

| | PPVE content (% by mass) | MFR (g/10 min) | Number of functional groups (number/C10$^6$) | Melting point (° C.) |
|---|---|---|---|---|
| Comparative Example 1 | 4.4 | 17.6 | <6 | 304 |
| Comparative Example 2 | 4.2 | 16.2 | <6 | 304 |
| Comparative Example 3 | 4.0 | 16.0 | <6 | 305 |
| Comparative Example 4 | 3.9 | 24.2 | <6 | 305 |
| Comparative Example 5 | 4.0 | 21.6 | 272 | 305 |
| Comparative Example 6 | 4.4 | 21.0 | <6 | 304 |
| Comparative Example 7 | 3.3 | 22.0 | 29 | 309 |
| Example 1 | 3.6 | 18.0 | 15 | 307 |
| Example 2 | 3.8 | 20.0 | <6 | 308 |
| Example 3 | 4.0 | 22.0 | <6 | 305 |

The description of "<6" in Table 3 means that the number of functional groups is less than 6.

Then, by using the obtained pellets, the following properties were evaluated. The results are shown in Table 4.

(Abrasion Test)

By using the pellets and a heat press molding machine, a sheet-shape test piece of approximately 0.2 mm in thickness was prepared, and this was cut out into a test piece of 10 cm×10 cm. The prepared test piece was fixed on a test bench of a Taber abrasion tester (No. 101 Taber type abrasion tester with an option, manufactured by YASUDA SEIKI SEISAKUSHO, LTD.) and the abrasion test was carried out under the conditions of at a temperature of 25° C. and a load of 500 g, using an abrasion wheel CS-10 (rotationally polished in 20 rotations with an abrasive paper #240) and at a rotation rate of 60 rpm by using the Taber abrasion tester. The weight of the test piece after 1,000 rotations was measured, and the same test piece was further subjected to the test of 10,000 rotations and thereafter, the weight thereof was measured. The abrasion loss was determined by the following formula.

Abrasion loss (mg)=$M1-M2$

M1: the weight of the test piece after the 1,000 rotations (mg)

M2: the weight of the test piece after the 10,000 rotations (mg)

(Oxygen Permeation Coefficient)

By using the pellets and a heat press molding machine, a sheet-shape test piece of approximately 0.1 mm in thickness was prepared. Using the obtained test piece, the measurement of the oxygen permeability was carried out according to a method described in JIS K7126-1:2006 by using a differential gas permeability tester (L100-5000 gas permeability tester, manufactured by Systech illinois). The numerical values of the oxygen permeability was obtained with a permeation area of 50.24 cm$^2$, at a test temperature of 70° C., and at a test humidity of 0% RH. The oxygen permeation coefficient was calculated by using the obtained oxygen permeability and the test piece thickness by the following formula.

Oxygen permeation coefficient (cm$^3$·mm/(m$^2$·24 h·atm))=$GTR \times d$

GTR: oxygen permeability (cm$^3$/(m$^2$·24 h·atm))

d: test piece thickness (mm)

(Methyl Ethyl Ketone (MEK) Permeability)

By using the pellets and a heat press molding machine, a sheet-shape test piece of approximately 0.1 mm in thickness was prepared. 10 g of MEK was put in a test cup (permeation area: 12.56 cm$^2$), and the test cup was covered with the sheet-shape test piece; and a PTFE gasket was pinched and fastened to hermetically close the test cup. The sheet-shape test piece was brought into contact with the MEK, and held at a temperature of 60° C. for 60 days, and thereafter, the test cup was taken out and allowed to stand at room temperature for 1 hour; thereafter, the amount of the mass lost was measured. The MEK permeability (mg·cm/m$^2$·day) was determined by the following formula.

MEK permeability (mg·cm/m$^2$·day)=[the amount of the mass lost (mg)×the thickness of the sheet-shape test piece (cm)]/[the permeation area (m$^2$) ·day]

(Evaluation of Creep Resistance)

The measurement of the creep resistance was carried out according to a method described in ASTM D395 or JIS K6262:2013. A molded article of 13 mm in outer diameter and approximately 8 mm in height was prepared by using the pellets and a heat press molding machine. The obtained molded article was cut to prepare a test piece of 13 mm in outer diameter and 6 mm in height. The prepared test piece was compressed by using a compression device at ambient temperature to a compression deformation rate of 25%. The compressed test piece fixed on the compression device was allowed to stand still in an electric furnace at 80° C. for 72 hours. The compression device was taken out from the electric furnace, and cooled to room temperature; thereafter, the test piece was dismounted. The collected test piece was allowed to stand at room temperature for 30 min, and the height of the collected test piece was measured and the proportion of recovery was determined by the following formula.

Proportion of recovery (%)=$(t_2-t_1)/t_3 \times 100$ $t_1$: the height of a spacer (mm)

$t_2$: the height of the test piece dismounted from the compression device (mm)

$t_3$: the height (mm) after being compressively deformed

In the above test, $t_1$ was 4.5 mm and $t_3$ was 1.5 mm.

(Load Deflection Rate at 95° C.)

By using the pellets and a heat press molding machine, a sheet-shape test piece of approximately 3 mm in thickness was prepared, this was cut out into a test piece of 80×10 mm, which was heated in an electric furnace at 100° C. for 20 hours. Except for using the obtained test piece, the test was carried out according to a method described in JIS K-K 7191-1 using a heat distortion tester (manufactured by YASUDA SEIKI SEISAKUSHO, LTD.) under the conditions of at a test temperature of 30 to 150° C., a temperature-increasing rate of 120° C./hour, a bending stress of 1.8 MPa and a flatwise method. The load deflection rate was determined by the following formula. A sheet having a low load deflection rate at 95° C. is excellent in the rigidity at high temperatures.

Load deflection rate (%)=a2/a1×100 a1: the test piece thickness before test (mm)
a2: the amount of deflection at 95° C. (mm)
(60,000 Times Tensile Strength Retention Ratio)

The 60,000 times tensile strength retention ratio was measured by using a fatigue testing machine MMT-250NV-10 manufactured by Shimadzu Corporation. By using the pellets and a heat press molding machine, a sheet of about 2.4 mm in thickness was prepared, and by using an ASTM D1708 micro dumbbell, a dumbbell-shape sample (thickness: 2.4 mm, width: 5.0 mm, measurement section length: 22 mm) was prepared. The sample was mounted on a measurement jig, and the measurement jig was installed in a constant-temperature vessel at 150° C. in a state where the sample was mounted. The tension in the uniaxial direction was repeated at a stroke of 0.2 mm and a frequency of 100 Hz, and the tensile strength for each tension (the tensile strength when the stroke was +0.2 mm) was measured. The 60,000 times tensile strength retention ratio was calculated from the measured value according to the following formula.

60,000 times tensile strength retention ratio (%)=tensile strength (60,000 times) (mN)/tensile strength (5,000 times) (mN)×100

The 60,000 times tensile strength retention ratio is the ratio of the tensile strength when repeated loads are applied 60,000 times to the tensile strength when repeated loads are applied 5,000 times. A sheet having a high 60,000 times tensile strength retention ratio retains the initial tensile strength even after repeated loads are applied 60,000 times, and is excellent in the deterioration resistance to repeated loads.

(Bending Crack Test)

A sheet of approximately 2 mm in thickness was prepared by using the pellets and a heat press molding machine. The obtained sheet was punched out by using a rectangular dumbbell of 13.5 mm×38 mm to obtain 3 test pieces. A notch was formed on the middle of a long side of the each obtained test piece according to ASTM D1693 by a blade of 19 mm×0.45 mm. Then, the three notched test pieces were mounted on a stress crack test jig according to ASTM D1693, and heated in an electric furnace at 150° C. for 24 hours; thereafter, the notches and their vicinities were visually observed and the number of cracks was counted.

Good: the number of cracks was 0
Poor: the number of cracks was 1 or more
(Injection Moldability)
Conditions The copolymer was injection molded by using an injection molding machine (SE50EV-A, manufactured by Sumitomo Heavy Industries, Ltd.) set at a cylinder temperature of 390° C., a mold temperature of 180° C. and an injection speed of 10 mm/s. The mold used was a mold (100 mm×100 mm×2.0 mmt) Cr plated on HPM38. The obtained injection molded article was observed and evaluated according to the following criteria. The presence/absence of roughness of the surface was checked by touching the surface of the injection molded article.

3: The entire surface of the injection molded article is flat
2: Roughness is observed on the surface within 1 cm from the portion where the gate of the mold was positioned
1: Roughness is observed on the entire surface of the injection molded article
0: The entire cavity of the mold is not filled with the copolymer, and the injection molded article does not have a desired form (Electric Wire Coating Test)

Extrusion coating of the copolymer in the following coating thickness was carried out on a silver plated conductor of 19 strands each 0.08 mm in diameter by using a 30-mmφ electric wire coating forming machine (manufactured by Tanabe Plastics Machinery Co., Ltd.), to thereby obtain a coated electric wire. The extrusion conditions for the electric wire coating were as follows.

a) Core conductor: about 0.40 mm in conductor diameter (0.08 mm×19 strands)
b) Coating thickness: 0.30 mm
c) Coated electric wire diameter: 1.00 mm
d) Electric wire take-over speed: 140 m/min
e) Extrusion condition:
   Cylinder screw diameter=30 mm, a single screw extruder of L/D=24
   Die (inner diameter)/tip (outer diameter)=10.0 mm/4.0 mm
   Set temperature of the extruder: barrel section C-1 (330° C.), barrel section C-2 (360° C.), barrel section C-3 (375° C.), head section H (390° C.), die section D-1 (405° C.), die section D-2 (395° C.). Set temperature for preheating core wire: 80° C.

(Variation of Outer Diameter)

The outer diameter of the obtained coated electric wire was continuously measured for 1 hour using an outer diameter measuring device (ODAC18XY manufactured by ZUMBACH Electronic AG). The variation value of the outer diameter was determined by rounding off the outer diameter value most deviated from a predetermined outer diameter value (1.00 mm) among the measured outer diameter values to two decimal places. The proportion of the absolute value of the difference between the predetermined outer diameter and the variation value of the outer diameter to the predetermined outer diameter (1.00 mm) (the variation rate of the outer diameter) was calculated, and evaluated according to the following criteria.

(The variation rate of the outer diameter (%))=|(the variation value of the outer diameter)−(predetermined outer diameter)|/(predetermined outer diameter)×100

±0.01: the variation rate of the outer diameter is 1% or lower
±0.02: the variation rate of the outer diameter is higher than 1% and 2% or lower
Poor: the variation rate of the outer diameter is higher than 2%

(Dielectric Loss Tangent)

By melt forming the pellets, a cylindrical test piece of 2 mm in diameter was prepared. The prepared test piece was set in a cavity resonator for 6 GHz, manufactured by KANTO Electronic Application and Development Inc., and the dielectric loss tangent was measured by a network analyzer, manufactured by Agilent Technologies Inc. By analyzing the measurement result by analysis software "CPMA", manufactured by KANTO Electronic Application and Development Inc., on PC connected to the network analyzer, the dielectric loss tangent (tan δ) at 20° C. at 6 GHz was determined.

TABLE 4

| | Abrasion loss (mg) | Oxygen permeation coefficient cm³·mm/(m²·24 h·atm) | MEK permeability (mg·cm/m²·day) | Evaluation of creep resistance Proportion of recovery (%) | Load deflection rate at 95° C. (%) | 60,000 Times tensile strength retention ratio (%) | Crack test 150° C. | Injection moldability | Electric wire coating test Variation of outer diameter | Dielectric loss tangent |
|---|---|---|---|---|---|---|---|---|---|---|
| Comparative Example 1 | 20.5 | 740 | 63.0 | 26% | 49% | 96.2 | Good | 1 | ±0.02 | 0.00037 |
| Comparative Example 2 | 20.6 | 730 | 62.9 | 28% | 48% | 94.2 | Good | 0 | Poor | 0.00036 |
| Comparative Example 3 | 21.1 | 712 | 62.3 | 29% | 47% | 93.1 | Good | 0 | Poor | 0.00036 |
| Comparative Example 4 | 25.1 | 659 | 59.3 | 28% | 42% | 92.6 | Poor | 3 | ±0.01 | 0.00034 |
| Comparative Example 5 | 23.4 | 767 | 66.8 | 25% | 44% | 93.2 | Good | 3 | ±0.02 | 0.00098 |
| Comparative Example 6 | 22.0 | 722 | 61.9 | 26% | 48% | 95.7 | Good | 3 | ±0.01 | 0.00036 |
| Comparative Example 7 | 25.5 | 627 | 58.7 | 31% | 37% | 89.5 | Poor | 3 | ±0.01 | 0.00040 |
| Example 1 | 23.0 | 663 | 60.7 | 30% | 41% | 91.3 | Good | 1 | ±0.02 | 0.00038 |
| Example 2 | 23.3 | 670 | 60.2 | 29% | 42% | 92.1 | Good | 2 | ±0.01 | 0.00035 |
| Example 3 | 23.6 | 679 | 60.3 | 28% | 44% | 93.2 | Good | 3 | ±0.01 | 0.00035 |

The invention claimed is:

1. A copolymer, comprising tetrafluoroethylene unit and perfluoro(propyl vinyl ether) unit,
   wherein the copolymer has a content of perfluoro(propyl vinyl ether) unit of 3.5 to 4.2% by mass with respect to the whole of the monomer units,
   a melt flow rate at 372° C. of 18.0 to 22.0 g/10 min, and the total number of —CF=CF$_2$, —CF$_2$H, —COF, —COOH, —COOCH$_3$, —CONH$_2$ and —CH$_2$OH of 50 or less per 10$^6$ main-chain carbon atoms.

2. An injection molded article, comprising the copolymer according to claim 1.

3. A coated electric wire, comprising a coating layer comprising the copolymer according to claim 1.

4. A formed article comprising the copolymer according to claim 1, wherein the formed article is a bolt, a member to be compressed, a bottle, or an electric wire coating.

* * * * *